July 10, 1934.  E. KLOTZ ET AL  1,965,655
POWER SUPPLY
Filed Sept. 18, 1929
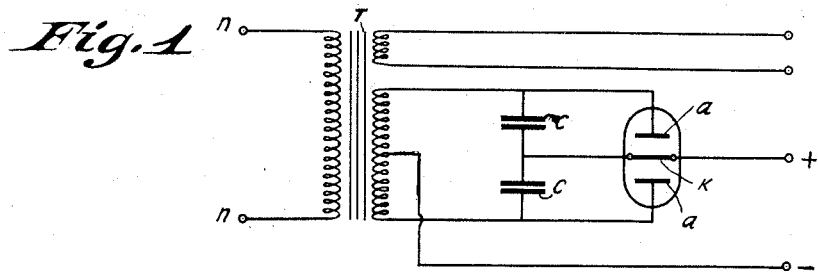
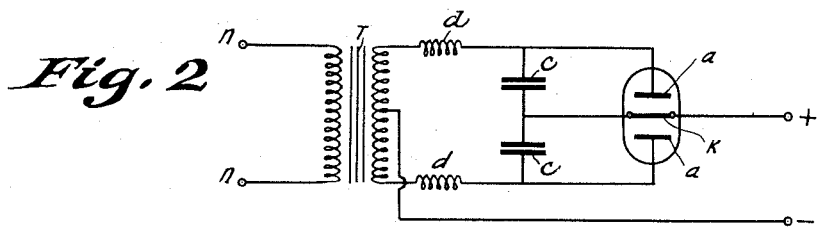
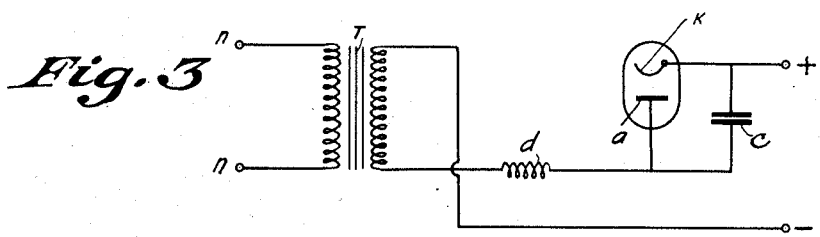
INVENTORS
ERNST KLOTZ & ERICH ZEPLER
BY
ATTORNEY Patented July 10, 1934

1,965,655

UNITED STATES PATENT OFFICE 1,965,655

POWER SUPPLY

Ernst Klotz and Erich Zepler, Berlin, Germany, assignors to Telefunken Gesellschaft für Drahtlose Telegraphie m. b. H., Berlin, Germany, a corporation of Germany Application September 18, 1929, Serial No. 393,338
In Germany October 25, 1928

2 Claims. (Cl. 175—363)

The present invention relates broadly to a rectifying circuit and more particularly to a method of preventing high frequency disturbances originating therein from affecting the receiving apparatus.

The invention will be more fully understood by reference to the following specification and the accompanying drawing in which, Figure 1 represents diagrammatically a rectifier tube circuit in which two condensers are placed in parallel with the two halves of the rectifier;

Figure 2 illustrates diagrammatically a preferred embodiment of our invention applied to a full wave rectifier; and, Figure 3 illustrates our invention applied to a half wave rectifier.

When alternating current receiver sets are operated in combination with certain rectifiers, such as, e. g., rectifiers of the gas discharge type, the latter become the source of radio frequency disturbances for the connected receiver. To remedy this inconvenience, condensers may be used in parallel to the respective halves of the rectifier.

This scheme is shown in Fig. 1. The terminals of the secondary winding of a transformer whose primary is united with the network $n$, $n$, are associated with the plates $a$, $a$, of the rectifier. Between the cathode $k$ and the neutral point of the secondary transformer winding is taken off the rectified potential, condensers C C being placed in parallel with the two halves of the rectifier.

However, experience has shown that this well-known condenser scheme fails to eliminate all trouble no matter what the circumstances.

Now, the present invention is based upon understanding of the fact that the trouble arising in spite of the provision of the condensers as stated is due to that the radio frequency variations find a path from the rectifier by way of the secondary winding of transformer T, and thus come to act in an undesirable manner upon the filament leads and the plate leads, or find a chance to react upon the network. The latter by the ensuing radiations is liable to unfavorably affect the receiver united with the rectifier, not to mention this possible chance that it may disagreeably influence also other receivers connected with the network if the latter is used to act as an antenna.

By fully appreciating these factors, all of the ensuing disturbances as described can be obviated according to this invention by that, in combination with parallel-connected condensers, the rectifier is separated from the secondary winding of the transformer by means of choke-coils acting as stoppers for radio frequency variations.

Fig. 2 shows a scheme according to the invention in the case of a full-wave rectifier, where each plate $a$ is separated from the secondary winding of the transformer by a suitable choke-coil $d$.

Fig. 3 shows a similar scheme for the case of a half-wave rectifier. In Figure 3, K represents the cathode of a half wave rectifier and $a$ the anode. The condenser C is shown shunted across the anode and cathode similar to the arrangements shown in Figures 1 and 2. Between the secondary of the transformer T and the anode $a$ there is connected the choke coil $d$ which corresponds to the choke coils $d$, $d$ of Figure 2 and is placed in the circuit for similar reasons. The remaining portions of Figure 3 are the same as Figures 1 and 2.

What we claim is:

1. A rectifier system comprising a full wave thermionic rectifier, a transformer having a secondary winding and a primary winding adapted to be energized by alternating current, one end of said secondary winding being connected through a choke coil to an anode of said rectifier, the other end of said secondary being connected through a choke coil to the other anode of said rectifier, a pair of condensers in series connected across the two anodes and a connection between the cathode of said rectifier and a point intermediate said two condensers.

2. An arrangement adapted to eliminate radio frequency disturbances originating from the operation of rectifier tubes in alternating current supplied receiving apparatus and the like of the type wherein a source of alternating current is connected through a rectifier, provided with an anode and a cathode, to a utilizing system, characterized by that a condenser is connected between the cathode of the rectifier and the terminal of the alternating current source connected to the anode of the tube and that a choke coil is inserted in the lead connecting the said alternating current source terminal with the anode of the rectifier tube for insuring radio frequency separation of the rectifier tube and the source of alternating current.

ERNST KLOTZ.
ERICH ZEPLER.